(12) United States Patent
Wilkerson et al.

(10) Patent No.: US 10,207,466 B2
(45) Date of Patent: Feb. 19, 2019

(54) APPARATUS FOR FORMING THICK THERMOPLASTIC COMPOSITE STRUCTURES

(71) Applicant: The Boeing Company, Chicago, IL (US)

(72) Inventors: Randall Dow Wilkerson, O'Fallon, MO (US); James Rodney Fox, University City, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/012,423

(22) Filed: Feb. 1, 2016

(65) Prior Publication Data
US 2016/0144578 A1  May 26, 2016

Related U.S. Application Data

(62) Division of application No. 13/663,660, filed on Oct. 30, 2012, now Pat. No. 9,248,613.

(51) Int. Cl.
  *B29B 11/16* (2006.01)
  *B29B 13/00* (2006.01)
  (Continued)

(52) U.S. Cl.
  CPC ............ *B29C 70/50* (2013.01); *B29C 43/265* (2013.01); *B29C 43/28* (2013.01); *B29C 43/305* (2013.01);
  (Continued)

(58) Field of Classification Search
  CPC ....... B29C 43/22; B29C 70/50; B29C 70/504; B29C 70/506; B29C 70/502; B29C 70/508; B29C 43/222; B29C 43/224; B29C 43/226; B29C 43/228; B29C 43/26; B29C 43/265; B29C 43/28; B29C 43/30; B29C 43/305; B29C 43/52; B29C 70/52; B29C 31/08;
  (Continued)

(56) References Cited

U.S. PATENT DOCUMENTS 3,545,370 A * 12/1970 Caughey .................. B27D 3/04
                                                    100/144
4,002,114 A *  1/1977 Guttinger .................. B30B 5/06
                                                    100/118
(Continued)

FOREIGN PATENT DOCUMENTS

DE      4017978 C2    9/1993
EP      0317861 A2    5/1989
(Continued)

OTHER PUBLICATIONS

International Search Report and Written Opinion, dated Dec. 12, 2013, regarding Application No. PCT/US2013/058670, 11 pages.
(Continued)

*Primary Examiner* — Jeffrey M Wollschlager
(74) *Attorney, Agent, or Firm* — Yee & Associates, P.C.

(57) ABSTRACT

A method and apparatus are used to pre-consolidate and de-bulk a thermoplastic composite ply stack prior to full consolidation and forming to the final part shape. Pre-consolidation and de-bulking is achieved by heating the ply stack to a temperature below the melting point of the thermoplastic in order to soften the plies, and then compress the ply stack.

17 Claims, 6 Drawing Sheets

(51) Int. Cl.
| | |
|---|---|
| *B29C 31/00* | (2006.01) |
| *B29C 31/08* | (2006.01) |
| *B29C 43/14* | (2006.01) |
| *B29C 43/26* | (2006.01) |
| *B29C 43/28* | (2006.01) |
| *B29C 43/30* | (2006.01) |
| *B29C 43/52* | (2006.01) |
| *B29C 53/04* | (2006.01) |
| *B29C 53/38* | (2006.01) |
| *B29C 70/50* | (2006.01) |
| *B29C 70/52* | (2006.01) |
| *B29L 31/30* | (2006.01) |
| *B29K 101/12* | (2006.01) |
| *B29K 105/00* | (2006.01) |

(52) U.S. Cl.
CPC .............. *B29C 43/52* (2013.01); *B29C 70/52* (2013.01); *B29B 11/16* (2013.01); *B29B 2013/005* (2013.01); *B29C 31/008* (2013.01); *B29C 31/08* (2013.01); *B29C 31/085* (2013.01); *B29C 43/146* (2013.01); *B29C 53/04* (2013.01); *B29C 53/38* (2013.01); *B29C 70/527* (2013.01); *B29C 2043/147* (2013.01); *B29K 2101/12* (2013.01); *B29K 2105/253* (2013.01); *B29L 2031/3076* (2013.01)

(58) Field of Classification Search
CPC ..... B29C 43/146; B29C 53/38; B29C 31/008; B29C 31/085; B29K 2105/253; B29K 2101/12; B29L 2031/3076; B29B 2013/005; B29B 11/16
See application file for complete search history.

(56) References Cited

U.S. PATENT DOCUMENTS

| | | | |
|---|---|---|---|
| 4,624,820 A | 11/1986 | Barraclough | |
| 5,057,175 A | 10/1991 | Ashton | |
| 5,078,821 A | 1/1992 | Garvey et al. | |
| 5,236,646 A | 8/1993 | Cochran et al. | |
| 5,484,500 A * | 1/1996 | Kaufmann | B32B 27/06 156/198 |
| 5,493,961 A * | 2/1996 | Gerhardt | B27N 3/24 100/151 |
| 6,312,247 B1 | 11/2001 | Kassuelke et al. | |
| 7,807,005 B2 | 10/2010 | Rubin et al. | |
| 7,871,553 B2 | 1/2011 | Wilkerson et al. | |
| 8,425,705 B2 | 4/2013 | Bouvet et al. | |
| 8,425,708 B2 | 4/2013 | Rubin et al. | |
| 9,248,613 B2 | 2/2016 | Wilkerson et al. | |
| 2002/0059976 A1* | 5/2002 | Taggart | B29C 70/228 156/177 |
| 2006/0118238 A1* | 6/2006 | Borazghi | B29C 43/34 156/309.6 |
| 2007/0116991 A1* | 5/2007 | Balthes | B29C 43/003 428/35.6 |
| 2007/0175571 A1 | 8/2007 | Rubin et al. | |
| 2007/0175572 A1 | 8/2007 | Rubin et al. | |
| 2007/0175573 A1 | 8/2007 | Fox et al. | |
| 2007/0175575 A1 | 8/2007 | Rubin et al. | |
| 2008/0185756 A1 | 8/2008 | Wilkerson et al. | |
| 2008/0314498 A1 | 12/2008 | Lee et al. | |
| 2009/0071597 A1 | 3/2009 | Lee et al. | |
| 2009/0078362 A1 | 3/2009 | Wilkerson et al. | |
| 2010/0225016 A1 | 9/2010 | Prebil et al. | |
| 2010/0319841 A1 | 12/2010 | Rubin et al. | |
| 2011/0206906 A1 | 8/2011 | Rubin et al. | |
| 2012/0000597 A1 | 1/2012 | Astwood et al. | |
| 2014/0117582 A1 | 5/2014 | Wilkerson et al. | |

FOREIGN PATENT DOCUMENTS

| | | |
|---|---|---|
| FR | 2929167 A1 | 10/2009 |
| JP | H08108483 A | 4/1996 |
| JP | 2010516521 A | 5/2010 |
| WO | WO2011106117 A1 | 9/2011 |

OTHER PUBLICATIONS

International Preliminary Report on Patentability, dated May 5, 2015, regarding Application No. PCT/US2013/058670, 7 pages.
Smith et al., "Progressive Forming of Thermoplastic Laminates," Department of Materials Science and Engineering, The University of Alabama at Birmingham, copyright 2011, 7 pages.
Office Action, dated Jan. 26, 2015, regarding U.S. Appl. No. 13/663,660, 15 pages.
Final Office Action, dated Jun. 9, 2015, regarding U.S. Appl. No. 13/663,660, 9 pages.
Notice of Allowance, dated Sep. 23, 2015, regarding U.S. Appl. No. 13/663,660, 9 pages.
European Patent Office, Communication Pursuant to Article 94(3) EPC, Application No. 13773445.5, dated May 22, 2017, 5 pages.
The State Intellectual Property Office of China, First Notification of Office Action, Application No. 201380055107, 9 pages.
Japanese Notice of Reasons for Rejections, dated Aug. 1, 2017, regarding Application No. 2015539596, 10 pages.

* cited by examiner

APPARATUS FOR FORMING THICK THERMOPLASTIC COMPOSITE STRUCTURES

CROSS-REFERENCE TO RELATED APPLICATION

This application is a divisional of and claims the benefit of priority to U.S. patent application Ser. No. 13/663,660, filing date Oct. 30, 2012, the entire contents of which are incorporated herein by reference.

BACKGROUND INFORMATION

1. Field

The disclosed embodiments broadly relate to fabrication of composite laminates, and deal more particularly with a method and apparatus for forming thick thermoplastic composite structures.

2. Background

Fiber reinforced thermoplastic laminates may be fabricated by assembling a stack of pre-preg plies, and consolidating the ply stack into a finished part. Consolidation is achieved by heating the plies to their melt temperature and molding the ply stack to the desired part shape using conventional compression molding, continuous compression molding or other techniques. During molding, slippage of the plies relative to each other allows the ply stack to change shape and conform to the geometry of a mold tool. Thin thermoplastic laminates comprising relatively few pre-preg plies may be fabricated without difficulty using continuous compression molding, in part because the heat required to melt the thermoplastic travels relatively quickly throughout the thickness of the laminate.

Problems may arise, however when fabricating thermoplastic composite laminates that are relatively thick, especially those having complex geometries. When the thermoplastic resin melts during consolidation and forming, excessive material movement required for consolidation allows reinforcing fibers to move and distort both in-plane and out-of-plane.

Another problem in forming thick thermoplastic composite laminates is caused by excessive material bulk resulting from the need for a large number of plies in the ply stack. Ply stacks that are particularly thick may be difficult or impossible to consolidate and mold to shape. Material bulk may be partially accounted for by making adjustments in mold tooling, however it may nevertheless be difficult to fully consolidate the ply stack during forming. The inability to fully consolidate thick ply stacks due to excessive material bulk, may lead to porosities and internal voids in the finished part.

Accordingly, there is a need for a method and apparatus for fabricating thick thermoplastic composite laminates which de-bulks and partially consolidates a thermoplastic ply stack prior to molding in order to reduce, wrinkles, porosities and internal voids in the finished part. There is also a need for a method and apparatus as described above which reduces or eliminates fiber distortion as the ply stack is being formed to final shape.

SUMMARY

The disclosed embodiments provide a method and apparatus for forming thermoplastic composite laminate parts that are relatively thick and/or have complex geometries. Material bulk in unassembled ply stack is substantially reduced prior to full consolidation and forming, thereby reducing the need to account for material bulk in the tooling used to consolidate and form the part. The method employs a material de-bulking technique carried out at elevated temperature sufficient to soften the thermoplastic resin but below its melting point. This de-bulking results in partial consolidation of the ply stack in which the plies adhere to each other in face-to-face contact substantially throughout their surface areas, prior to being heated to the melt temperature in preparation for full consolidation and forming. As a result of this material de-bulking and partial consolidation, fiber distortion caused by material movement is substantially reduced, and wrinkling as well as porosities and internal voids are reduced or eliminated, all of which leads to improved part quality. In addition, the method and apparatus may allow fabrication of thicker thermoplastic composite laminates than has heretofore been possible. The apparatus includes a continuous compression molding (CCM) machine incorporating a pre-consolidation zone for de-bulking and pre-consolidating the ply stack prior to being consolidated and formed into the final part shape.

According to one disclosed embodiment, a method is provided for making a thick thermoplastic composite part. The method comprises assembling a ply stack including a plurality of thermoplastic composite plies, and pre-consolidating the ply stack, including softening the plies by heating the plies in the ply stack to a temperature below the melting point of the thermoplastic and compressing the ply stack. The method further comprises consolidating the pre-consolidated ply stack, including heating the ply stack to at least the melting temperature of the thermoplastic. Compressing the ply stack of softened plies includes applying pressure to the plies sufficient to de-bulk the ply stack, and may also include placing the ply stack between two tools, and forcing the tools together. Compressing the ply stack of softened the plies is performed in a continuous compression molding machine. Consolidating the pre-consolidated ply stack is performed by compacting the ply stack. The method may further comprise forming the ply stack to a desired shape as the ply stack is being consolidated. Forming the ply stack to the desired shape may also be performed in a continuous compression molding machine.

According to another disclosed embodiment, a method is provided for forming a thick thermoplastic composite part, comprising. The method comprises assembling a ply stack by laying up a plurality of thermoplastic composite plies on top of each other, and pre-consolidating the ply stack using a first set of parameters, the first set of parameters including a preselected first temperature, a preselected first pressure and a preselected first time duration. The method also includes consolidating the pre-consolidated ply stack using a second set of parameters, the second set of parameters including a preselected second temperature, a preselected second pressure and a preselected second time duration. Assembling the ply stack is performed by continuously feeding multiple thermoplastic composite plies into a continuous compression molding machine. The preselected first temperature is a temperature sufficient to soften the plies but is below the melting point of the thermoplastic. The preselected first pressure is sufficient to de-bulk the ply stack. The preselected first time duration is sufficient to allow the plies in the ply stack to soften at the preselected first temperature, and to allow de-bulking of the ply stack at the preselected first pressure. The preselected second temperature is high enough to result in melting of the thermoplastic plies in the ply stack, and the preselected second pressure is high enough to fully consolidate the ply stack.

According to another disclosed embodiment, a method is provided for continuous compression molding a thermoplastic composite part. The method comprises assembling a ply stack including a plurality of thermoplastic pre-preg plies, and de-bulking the ply stack by heating the plies to a temperature below their melting point and compressing the ply stack. The method further comprises molding the de-bulked ply stack into a desired part shape, including heating the plies to at least their melting point and further compressing the ply stack to fully consolidate the plies. Compressing the ply stack is performed by placing the ply stack between a pair of tools, and using the tools to apply a compaction pressure to the ply stack. De-bulking the ply stack and molding the ply stack may be performed in a continuous compression molding machine.

According to still another disclosed embodiment, apparatus is provided for compression molding of a thick thermoplastic composite part. The apparatus comprises a pre-consolidation zone and a consolidation zone. The pre-consolidation zone receives a ply stack of thermoplastic plies, and includes a heater for heating the ply stack and pre-consolidation tooling for compressing the ply stack. The consolidation zone includes consolidation tooling for consolidating and forming the pre-consolidated ply stack into the shape of the part. The apparatus may further comprise a pre-forming zone for pre-forming the ply stack after the ply stack has been pre-consolidated. The apparatus may also include a pulsating drive mechanism for moving the ply stack through the pre-consolidation zone and through the consolidation zone in continuous, incremental steps.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
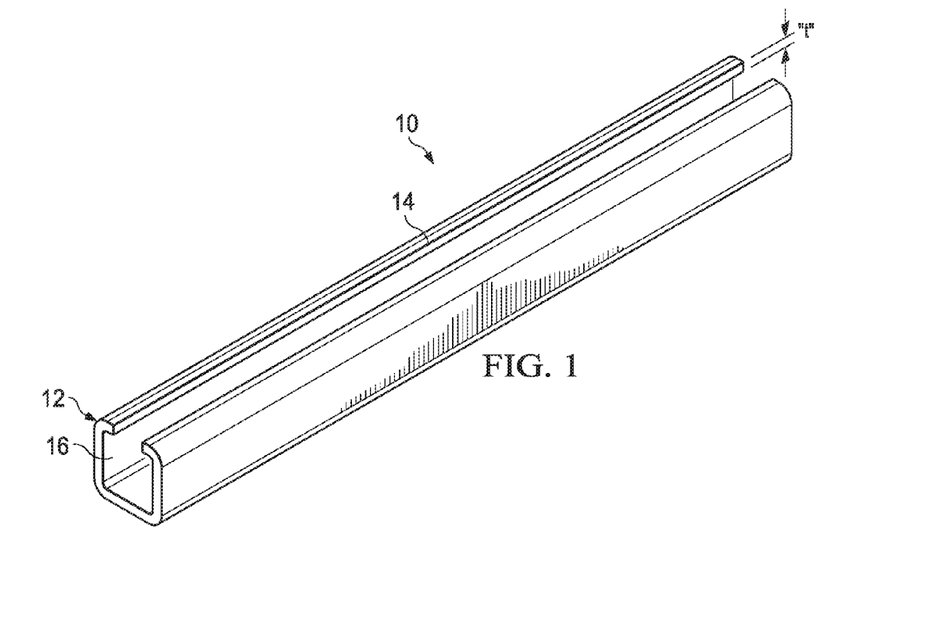
FIG. 1 is an illustration of a perspective view of a thick thermoplastic composite part fabricated in accordance with the disclosed method and apparatus.

Referring first to FIG. 1, the disclosed embodiments relate to a method of forming a relatively thick, thermoplastic composite (TCP) part 10. In the illustrated example, the TCP part 10 is a substantially straight, elongate structural member having a generally U-shaped cross-section 12 with inwardly turned flanges 14 forming a generally open interior 16. However, the disclosed method may be employed to form TCP structural members having a variety of other cross-sectional shapes, as well as curvatures or contours and/or varying thicknesses along their lengths. The TCP part 10 may comprise a laminate formed from a stack of pre-preg plies (not shown) which include a suitable thermoplastic polymer resin matrix such as, without limitation, polyetheretherketone ("PEEK"), polyetherketoneketone ("PEKK"), polyphenylsulfone ("PPS"), polyetherimide ("PEI"), which may be reinforced with a fibrous component such as glass (s-type or e-type) or carbon fiber (not shown). The reinforcing fibers within each ply may be oriented in a unidirectional or non-uniform arrangement, depending upon the particular application. The relative types, thicknesses, amounts of fibers within the polymer matrix, as well as the type of polymer matrix utilized in each ply may vary widely, based on numerous factors, including cost and the ultimate desired physical and mechanical properties of the part 10. The composite part has a thickness "t" that requires layup of a relatively large number of plies which may be difficult to form as a single ply stack.

Figure 2:
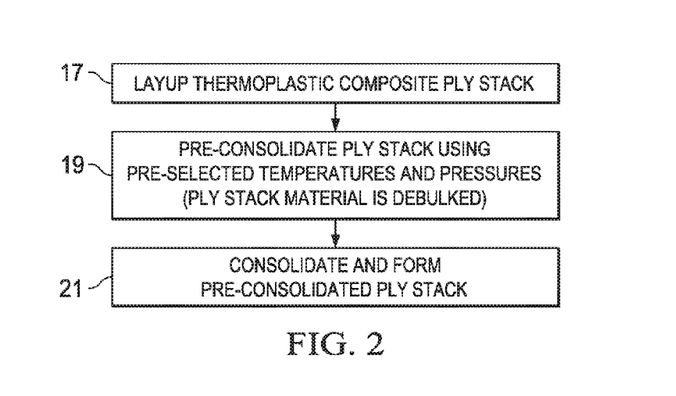
FIG. 2 is an illustration of a flow chart broadly showing the steps of a method for fabricating thick thermoplastic composite laminate parts.
Figure 3:
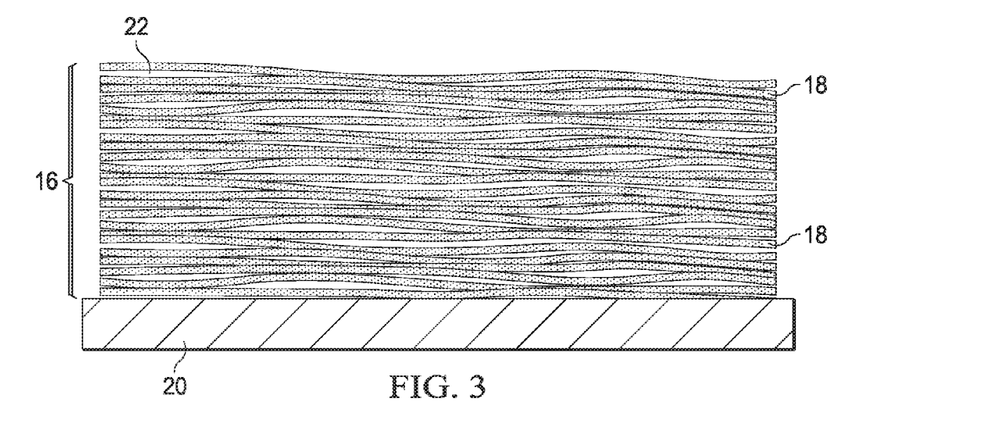
FIG. 3 is an illustration of a cross-sectional view of a stack of thermoplastic composite plies having been laid up on a tool.

Referring now to FIGS. 2-5, the TCP part 10 shown in FIG. 1 may be fabricated by a method that begins at step 17 shown in FIGS. 2, in which a TCP ply stack 16 shown in FIG. 3 is assembled on a suitable tool 24 other surface. The ply stack 16 comprises a plurality of thermoplastic pre-preg plies 18 that may be laid up on top of each other either by hand, or using automated material placement equipment (not shown). As shown in FIG. 3, the plies 18 in the ply stack 16 may not lie completely flat against each other, due to undulations or other irregularities in the plies 18 in their pre-preg state, resulting in wrinkling and/or voids or gaps 22 between at least some of the plies 18.

Figure 4:
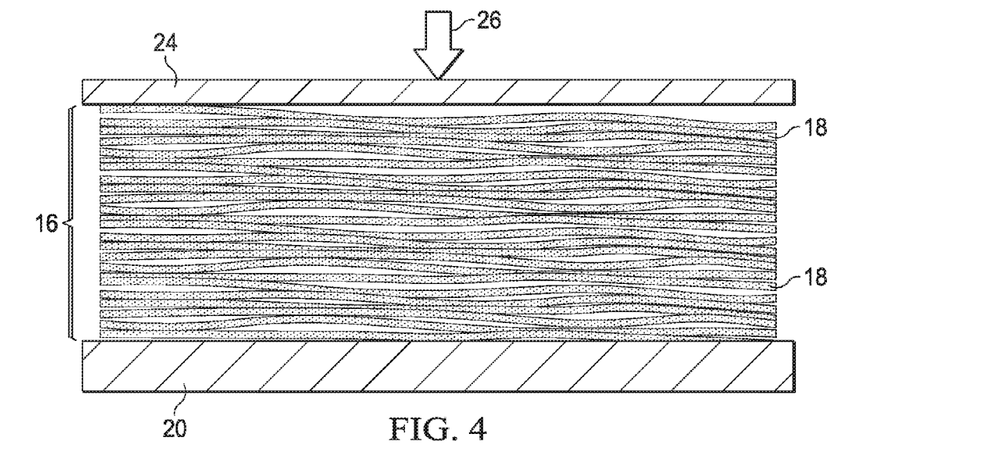
FIG. 4 is an illustration similar to Figure three but showing a tool having been placed on the ply stack in preparation for a pre-consolidation cycle.

The ply stack 16 having been laid up on the tool 20, the next step 19 of the method shown in FIG. 2 is carried out, which comprises pre-consolidating the ply stack 16 by subjecting the ply stack 16 to heat and pressure for a preselected length of time, resulting in de-bulking the ply stack 16. Referring to FIG. 4, in preparation for the pre-consolidation step 19, a second tool 24 may be placed over the ply stack 16 and forced 26 against the ply stack 16. The tools 20, 24 shown in FIG. 4 may comprise conventional platen-like tools installed in a conventional compression press (not shown). The tools 20, 24 may be specially configured to carry out pre-consolidation of the ply stack 16, but alternatively, the tools 20, 24 may comprise the tools that are later used to form the ply stack 16 into the final shape of the particular part 10 to be formed. For example, the tools 20, 24 may comprise matched dies having curvatures, contours and other surface features that are needed to form the ply stack 16 into the final shape of the part 10.

Figure 5:
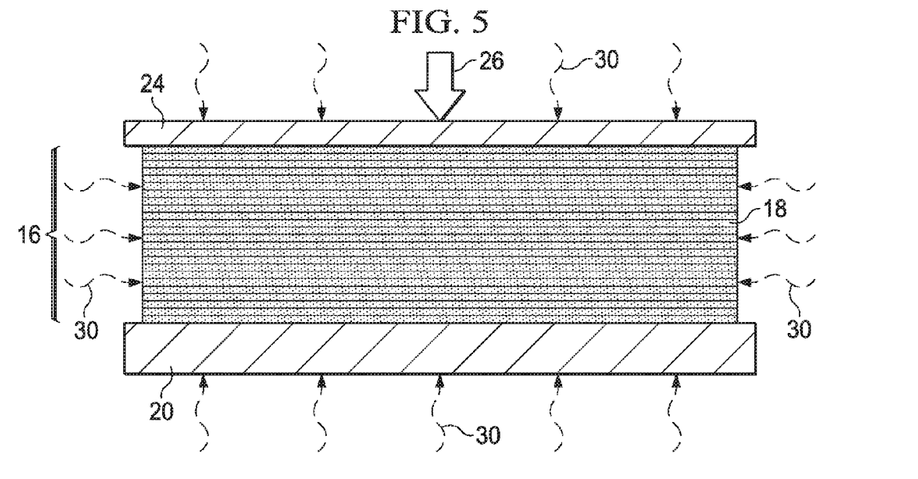
FIG. 5 is an illustration similar to FIG. 4 but showing the ply stack having been compressed in the tool to partially consolidate the ply stack while being heated to a temperature which softens the plies.

FIG. 5 illustrates the upper tool 20 having been forced 26 against the lower tool 20 to compress the ply stack 16 using a preselected amount of pressure or force 26. As pressure is applied to the ply stack 16, the ply stack 16 is heated 30 to a preselected temperature. The heating may be carried out by contact heating using heated tools 20, 24, or by carrying out the pre-consolidation cycle within an oven. Other processes may be used to apply the necessary pressure to the ply stack 16 during the pre-consolidation cycle, such as, without limitation, vacuum bag and/or autoclave processing. During the pre-consolidation cycle which results in de-bulking the ply stack 16, the ply stack 16 is heated to a "pre-consolidation temperature" at which the plies 18 soften and become readily pliable, but which is below the temperature at which the thermoplastic resin in the plies 18 begins to melt and flow. Softening of the plies 18 when the pre-consolidation temperature has been reached allows the plies 18 to flatten under the pressure 26, substantially eliminating any gaps for voids 22 between the plies 18 (FIG. 3) and partially consolidating the plies 18 so that they are tightly packed in face-to-face contact with each other over substantially their entire areas.

The pressure 26, the pre-consolidation temperature and the dwell time (the time period during which the ply stack 16 is subjected to the pre-consolidation temperature) are preselected and will vary with the application, including part thickness, part geometry, the type of thermoplastic material that is used as well as the type and size of the reinforcing fibers. In one typical application in which a ply stack 16 is assembled comprising 60 plies of carbon fiber pre-preg thermoplastic having a melt temperature of 350° C., satisfactory pre-consolidation and material de-bulking was achieved using a pre-consolidation temperature of 330° C., a pressure of 5 bars and a dwell time of approximately 80 seconds. Generally, the dwell time must be sufficient to allow the heat to penetrate all of the plies 18 in the ply stack 16 and bring the plies 18 up to the pre-consolidation temperature. The part in this example was formed at a temperature of 375° C. It should be noted here that the foregoing example is merely illustrative and should not be construed as limiting.

Following the pre-consolidation cycle described above, the ply stack 16 remains pre-consolidated until it is subsequently formed and fully consolidated, as shown at step 21 in FIG. 2. The ply stack 16 remains pre-consolidated because the combination of heat and pressure applied during the pre-consolidation cycle causes the plies 18 to adhere to each other and maintain their shape. Moreover, the adherence of the plies 18 to each other reduces excess material movement during subsequent consolidation and forming processes, thereby substantially eliminating in-plane and out-of-plane fiber distortion caused by excess ply material movement.

Figure 6:
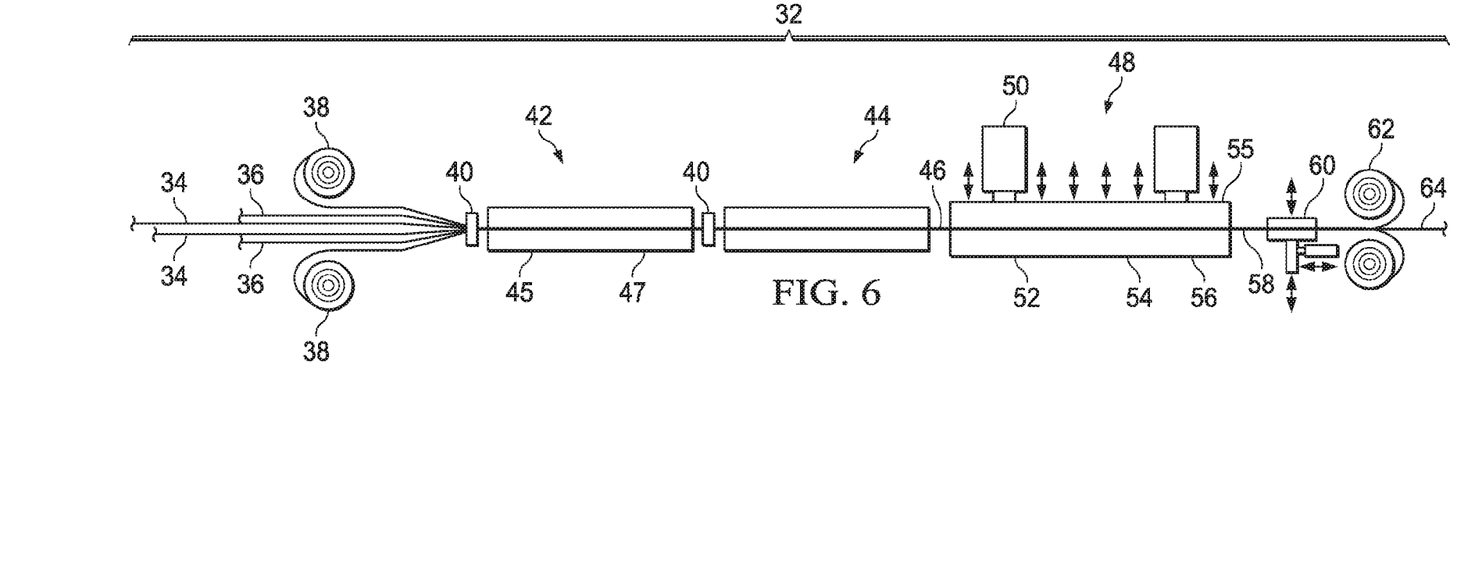
FIG. 6 is an illustration of a diagrammatic view of continuous compression molding apparatus used to carry out the disclosed method.

The disclosed method described above may be carried out as part of a continuous compression molding (CCM) process using a CCM machine 32 shown in FIG. 6. The CCM machine 32 may broadly include a pre-consolidation zone 42, a pre-forming zone 44, and a consolidation station 48. Multiple plies 34, 36 of composite materials are supplied either from continuous rolls (not shown) or in the form of tacked stacks (not shown) of precut TPC blanks, such as the ply stack 16 previously described. The plies 34, 36 of TPC material are fed along with sheet members forming mandrels 38 to the pre-consolidation zone 42. Guides 40 or other tooling elements may be used to pre-align and guide the plies 34, 36 into the pre-consolidation zone 42.

The pre-consolidation zone 42 may include suitable tooling 45, which may be similar to tools 20, 24 previously described, that function to compress the plies 34, 36 together during the pre-consolidation cycle which results in pre-consolidation and de-bulking of the plies 34, 36. The pre-consolidation zone 42 may also include a heater 47 that is used to heat the plies 34, 36 to the pre-consolidation temperature. The heater 47 may comprise an oven in which the pre-consolidation tooling 45 is contained, or may be a device that heats the tooling 45 in order to provide contact heating of the plies 34, 36 while the plies 34, 36 are being compressed by the tooling 45. In some embodiments, it may be possible to combine the pre-consolidation zone 42 with the pre-forming zone 44, in which case the tooling used for pre-forming the plies 34, 36 is also used to pre-consolidate the plies before they are heated to the melting temperature at the consolidation station 48.

Guides 40 may also be used to pre-align and guide the pre-consolidated ply stack along with mandrels 38, as well as optional filler materials (not shown) into the pre-forming zone 44. The pre-formed plies 34, 36 and mandrels 38 may be passed through an oven (not shown) to elevate the temperature of the ply materials in order to facilitate the pre-forming operations at pre-forming zone 44. Various features such as part flanges 14 (FIG. 1), for example, may be pre-formed in the pre-forming zone 44 using pressure applied to the plies 34, 36 by rollers 40 or other forming tools.

The pre-formed part 46, which has the general shape of the final part, exits the pre-forming zone 44 and moves into the consolidating operation 28. The consolidating operation 48 includes a plurality of standardized tool dies generally indicated at 55, that are individually mated with tool members (not shown) which have smooth outer surfaces engaged by the standardized dies, and inner surfaces that have tooled features. These tooled features are imparted to the pre-formed part 46 during the consolidation process. The commonality of the surfaces between the standardized dies 55 and the outer surfaces of the tool members eliminates the need for part-specific matched dies.

The consolidating operation 48 includes a pulsating drive mechanism 60 that moves the pre-formed part 46 forward within the consolidating operation 48 and away from the pre-forming zone 44, in continuous, incremental steps. As the pre-formed part 46 moves forward, the pre-formed part 46 first enters a heating zone 52 that heats the pre-formed part 46 to a temperature which allows the free flow of the polymeric component of the matrix resin in the plies 34, 36.

Next, the pre-formed part 46 moves forward into a pressing zone or operation 54 where standardized dies are brought down collectively or individually at predefined pressures sufficient to compress and consolidate (i.e. allow free-flow of the matrix resin) the various plies 34, 36 into the desired shape and thickness. As the dies 55 are opened, the pre-formed part 46 is incrementally advanced within the consolidation operation 48, following which the dies 55 are closed again, causing successive sections of the part 46 to be compressed within different temperature zones, and thereby consolidate the laminate plies in the compressed section. This process is repeated for each temperature zone of the dies 55 as the part 46 is incrementally advanced through the consolidation operation 48.

The fully formed and compressed (consolidated) part 46 then enters a cooling zone 56 which is separated from the pressing zone 54, wherein the temperature is brought below the free-flowing temperature of the matrix resin in the plies 34, 36 thereby causing the fused or consolidated part 46 to harden to its ultimate pressed shape. The consolidated and cooled part 58 then exits the consolidating operation 48, where the mandrels 38 are taken up on rollers 62. The final formed part 64 is removed at the end of the CCM machine 32.

Figure 7:
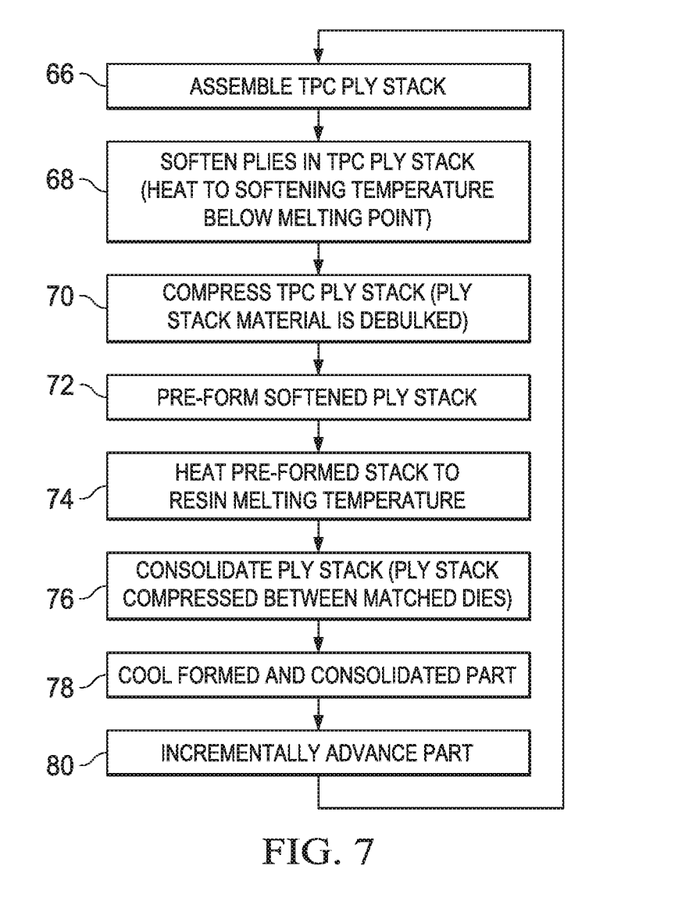
FIG. 7 is an illustration of a flow diagram showing the steps of a method of continuous compression molding employing pre-consolidation and material de-bulking.

FIG. 7 broadly illustrates the steps of forming a TPC laminate part 10 using the CCM machine 32 described above which includes pre-consolidation and de-bulking of the ply stack 16 before it is fully consolidated and formed. Beginning at step 66, a TPC ply stack 16 is assembled, either by pre-stacking plies and feeding them as a stack into the CCM machine 32, or by separately feeding plies into the machine 32, as described previously. At step 68, the plies 18 in the ply stack 16 are heated to a temperature that softens them, but below the melting point of the thermoplastic resin. Softening of the plies 18 is performed in the pre-consolidation zone 42 (FIG. 6).

At step 70, the ply stack 16 is compressed in the pre-consolidation zone 42, resulting in pre-consolidation of the ply stack 16, and de-bulking of the ply materials. At step 72, the softened ply stack 16 is pre-formed in the pre-forming zone 44, following which the pre-formed ply stack 16 is heated to the melting temperature of the resin, as shown at step 74. At step 76, the heated ply stack 16 is consolidated and formed into the desired of part shape at the consolidation station 48. As previously mentioned, this consolidation and forming process may be performed by passing the heated ply stack through matched dies which compress and sequentially form the ply stack 16 into the desired part shape. At step 78, the formed and consolidated part is cooled. The part is incrementally advanced, as shown at step 80, so that it progressively moves through the pre-consolidation zone 42, the pre-forming zone 44 and the consolidation station 48 in an incremental manner, drawn by the pulsating drive mechanism 60 (FIG. 6).

It should be noted here that although a CCM process has been described above for purposes of illustration, it should be noted that it may be possible to incorporate the disclosed method of pre-consolidation and a de-bulking into other types of molding processes, such as, without limitation, pultrusion and roll forming.

Figure 8:
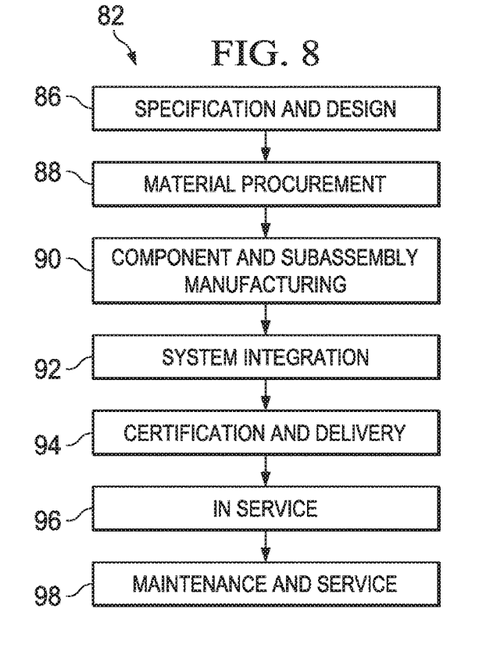
FIG. 8 is an illustration of a flow diagram of aircraft production and service methodology.
Figure 9:
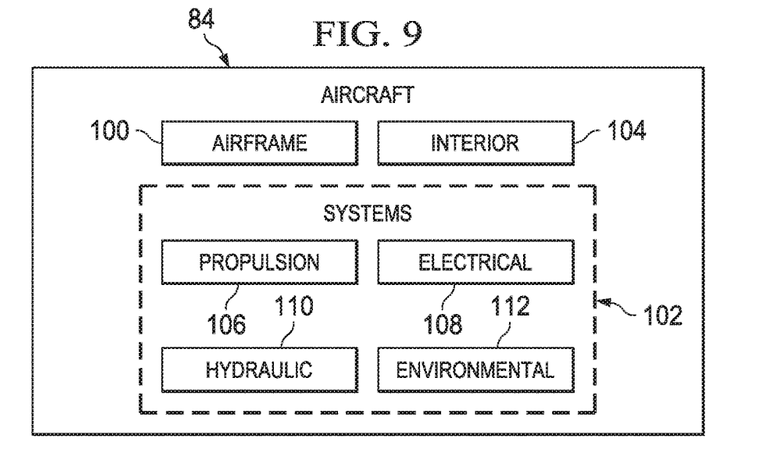
FIG. 9 is an illustration of a block diagram of an aircraft.

Embodiments of the disclosure may find use in a variety of potential applications, particularly in the transportation industry, including for example, aerospace, marine, automotive applications and other application where autoclave curing of composite parts may be used. Thus, referring now to FIGS. 8 and 9, embodiments of the disclosure may be used in the context of an aircraft manufacturing and service method 82 as shown in FIG. 8 and an aircraft 84 as shown in FIG. 9. Aircraft applications of the disclosed embodiments may include, for example, without limitation, forming of stiffener members such as, without limitation beams, spars and stringers, to name only a few. During pre-production, exemplary method 82 may include specification and design 86 of the aircraft before and material procurement 88. During production, component and subassembly manufacturing 90 and system integration 92 of the aircraft 84 takes place. Thereafter, the aircraft 84 may go through certification and delivery 96 in order to be placed in service 96. While in service by a customer, the aircraft 84 is scheduled for routine maintenance and service 98, which may also include modification, reconfiguration, refurbishment, and so on.

Each of the processes of method 82 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 84 produced by exemplary method 82 may include an airframe 100 with a plurality of systems 102 and an interior 104. Examples of high-level systems 102 include one or more of a propulsion system 106, an electrical system 108, a hydraulic system 110, and an environmental system 112. Any number of other systems may be included. Although an aerospace example is shown, the principles of the disclosure may be applied to other industries, such as the marine and automotive industries.

Systems and methods embodied herein may be employed during any one or more of the stages of the production and service method 82. For example, components or subassemblies corresponding to production process 90 may be fabricated or manufactured in a manner similar to components or subassemblies produced while the aircraft 96 is in service. Also, one or more apparatus embodiments, method embodiments, or a combination thereof may be utilized during the production stages 90 and 92, for example, by substantially expediting assembly of or reducing the cost of an aircraft 84. Similarly, one or more of apparatus embodiments, method embodiments, or a combination thereof may be utilized while the aircraft 96 is in service, for example and without limitation, to maintenance and service 98.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for continuous compression molding of a thick thermoplastic composite part, comprising:
   an assembly zone for assembling a ply stack including a plurality of thermoplastic composite plies into a generally flat, unshaped condition;
   a pre-consolidation zone into which the ply stack of thermoplastic plies may be fed for pre-consolidating the ply stack, the pre-consolidation zone including pre-consolidation platen tooling for compressing the ply stack over a pre-consolidation dwell time at the pre-consolidation temperature and at a pressure of about 5 bars to de-bulk the ply stack;
   a pre-forming zone for pre-forming the pre-consolidated ply stack, the pre-forming zone including pre-forming tooling for pre-forming at least one feature in the pre-consolidated ply stack such that the pre-formed ply stack takes a general shape of a final part;
   a consolidation zone including consolidation tooling for consolidating and forming the pre-formed ply stack into a shape of the part; and
   a pulsating drive mechanism for moving the ply stack in continuous, incremental steps through the pre-consolidation zone over the pre-consolidation dwell time, and subsequently through the consolidation zone.

2. The apparatus of claim 1, wherein the assembly zone assembles the ply stack by continuously feeding the plurality of thermoplastic composite plies into a continuous compression molding machine.

3. The apparatus of claim 1, wherein the apparatus is a continuous compression molding machine, and wherein the pre-forming zone is located subsequent to the pre-consolidation zone along a material path of the continuous compression molding machine.

4. The apparatus of claim 1, wherein the pre-forming zone comprises:
a number of pre-forming tools configured to pre-form at least one feature in the pre-consolidated ply stack such that a pre-formed ply stack takes a general shape of a final part.

5. The apparatus of claim 4, wherein the number of pre-forming tools comprises a number of rollers.

6. The apparatus of claim 4, wherein the number of pre-forming tools comprises matched dies having at least one surface feature that is needed to form the ply stack into the general shape of the final part.

7. The apparatus of claim 6, wherein the at least one surface feature is selected from a curvature of the matched dies and a contour of the matched dies.

8. The apparatus of claim 1, wherein the consolidation tooling is configured to apply pressure sufficient to consolidate a pre-formed ply stack.

9. The apparatus of claim 1, further comprising:
a first number of rollers in the assembly zone containing a number of sheet mandrels and configured to apply a sheet mandrel onto an outer surface of the ply stack; and
a second number of rollers configured to take up the sheet mandrel after thermoplastic composite part exits the consolidation zone.

10. The apparatus of claim 1, wherein the pre-consolidation zone further comprises:
a first heater for heating the ply stack to a pre-consolidation temperature below a melting temperature of the thermoplastic and for maintaining the ply stack at pre-consolidation temperature over a pre-consolidation dwell time.

11. The apparatus of claim 10, wherein the pre-forming zone further comprises:
a second heater for heating the ply stack at a temperature below the melting temperature of the thermoplastic.

12. The apparatus of claim 11, wherein the consolidation zone further comprises:
a third heater for heating the ply stack to at least the melting temperature of the thermoplastic.

13. The apparatus of claim 10, wherein the first heater is configured to maintain the ply stack at the temperature over a pre-consolidation dwell time.

14. The apparatus of claim 10, wherein the first heater comprises:
an oven, wherein the pre-consolidation tooling is contained within the oven.

15. The apparatus of claim 10, wherein the first heater comprises:
a device that heats the pre-consolidation tooling such that the pre-consolidation tooling provides contact heating of the ply stack of thermoplastic plies.

16. The apparatus of claim 15, wherein the pre-consolidation tooling provides contact heating of the ply stack while the thermoplastic plies are being compressed by the pre-consolidation tooling.

17. The apparatus of claim 11, wherein the
second heater heats the ply stack to a pre-forming temperature to facilitate pre-forming the ply stack in the pre-forming zone.

* * * * *

UNITED STATES PATENT AND TRADEMARK OFFICE
CERTIFICATE OF CORRECTION

PATENT NO. : 10,207,466 B2
APPLICATION NO. : 15/012423
DATED : February 19, 2019
INVENTOR(S) : Wilkerson et al.

Page 1 of 1

It is certified that error appears in the above-identified patent and that said Letters Patent is hereby corrected as shown below:

In the Claims

Column 8, Lines 47-48, "the pre-consolidation temparature" to read as --a pre-consolidation temperature--

Signed and Sealed this
Seventh Day of May, 2019

Andrei Iancu
*Director of the United States Patent and Trademark Office*